Aug. 24, 1943.　　　E. A. HUBLEY　　　2,327,898
CONTROL MECHANISM
Filed Nov. 27, 1942
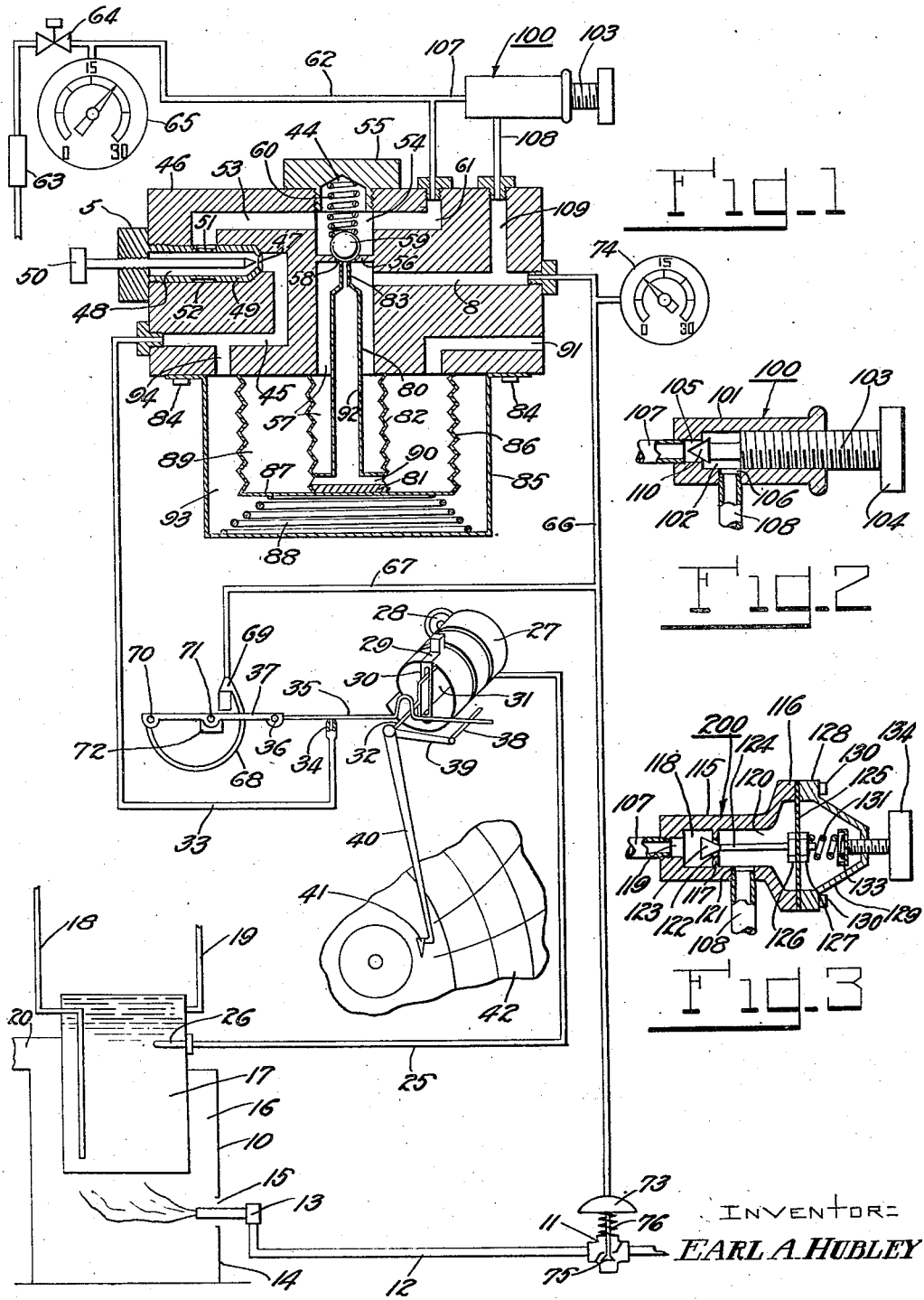
INVENTOR:
EARL A. HUBLEY
by Cameron MacLeod
Atty.

Patented Aug. 24, 1943

2,327,898

UNITED STATES PATENT OFFICE

2,327,898

CONTROL MECHANISM

Earl A. Hubley, Quincy, Mass., assignor to Mason-Neilan Regulator Co., Boston, Mass., a voluntary trust of Massachusetts Application November 27, 1942, Serial No. 467,281

9 Claims. (Cl. 137—153)

My invention relates to control mechanism of the fluid operated type, wherein fluid under pressure from a source of supply is governed by means responsive to a change in the value of a condition, and in turn varies a secondary pressure by which a servo motor is operated to restore the value of the condition to normal.

More particularly, this invention pertains to fluid operated means, including a control couple or equivalent device, which may be initially actuated by a condition responsive element to vary the pressure in a primary fluid system, and thereby actuate a pilot to provide a proportional variation of pressure in a secondary fluid system to which means affecting the value of the condition are responsive.

In a control system to which my invention relates, a pilot is made responsive to both a primary fluid pressure and to a secondary fluid pressure, a change of pressure in the former operating to reset the pilot to provide a proportionate change of pressure in the latter. To this end, the pilot may be provided with a bellows structure which is in operative connection with a supply and exhaust valve, the parts being arranged so that when a change in primary pressure occurs, the secondary pressure is varied by the pilot until the secondary pressure change is in proportion to the primary pressure change. Thus, for a predetermined over-all pressure range in the primary system, a predetermined proportionate over-all range of pressure is established in the secondary system, said last mentioned range being selected to operate a control valve, or equivalent device, from closed to full open positions. In a system of this character, the control valve assumes an opening corresponding to the pressure in the secondary system, and, therefore, the pressure in the secondary system may become a measure of the quantity of fluid passing through the control valve for any given operating condition.

In many industrial automatic control installations, it is important, because of the safety factor, that the pilot output, or secondary pressure, never drops below a predetermined value. An example of this may be found in the automatic control of fuel to burners, as herein illustrated, wherein it is essential that the automatic regulation of the control valve be protected against complete shut off in order to avoid blowing out the fires. While this may be accomplished by providing a by-pass, or mechanical stops in the control valve, or by utilizing additional fluid pressure relays, several disadvantages are inherent to the above methods. A by-pass, or mechanical stops in the control valve, necessitate changing the by-pass or stop adjustments for complete shut-down or for overhaul purposes and are subject to the human factor for accurate readjustment; and an auxiliary air relay system increases the complexity of the installation and results in unnecessary cost. Furthermore, where by-passes or mechanical stops are used and the control valve is remotely located, considerable delay may be involved in getting to the valve which may endanger the equipment or operating personnel in case of an emergency.

It is an object of this invention to provide a standard form of control mechanism of the fluid operated type, wherein a pilot responsive to a change of pressure in a primary system effects a proportionate change of pressure in a secondary system within maximum and minimum limits corresponding to the pressure operating range of a servo motor actuating element, such as the diaphragm of a motor valve or equivalent device, whereby the valve assumes an opening within its range of movement in proportional correspondence to the pressure change in the primary fluid pressure system.

It is an object of this invention to provide a control mechanism of the fluid operated type, wherein a pilot, which reacts to changes in pressure in a primary system over a predetermined range, and which both reacts to and establishes a proportionate change of pressure in a secondary system over a predetermined range, in combined with means which function with the pilot to restrict the range of automatic operation of a control valve, or equivalent device, to a selected portion only of its operating range.

It is an object of this invention to provide a control mechanism of the fluid operated type, wherein a control valve, or equivalent device, must automatically close in the event of failure of fluid operating pressure.

It is another object of this invention to provide a control mechanism of the fluid operated type, including a primary fluid pressure system, a pilot, and a secondary fluid pressure system which provides an automatic range of operation suitable for actuating a valve, or equivalent device, from a predetermined low pressure limit at which the valve may be closed to a predetermined high pressure limit at which the valve may be fully open, combined with means, which function with the pilot to provide a selected nonautomatic portion of the control valve pressure operating range, whereby the automatic range may be limited from a pressure at which the control valve is fully open to some selected intermediate pressure at which the valve assumes a predetermined minimum opening.

It is still another object of this invention to provide means, combined with control mechanism of the fluid operated type, for restricting the automatic control of a valve, or equivalent device, to a portion only of its operating range, which may be incorporated with the instrument mechanism without modifying its standard construction.

These and other objects of this invention will be more fully understood when taken in connection with the accompanying drawing, in which:

Fig. 1 is a view, partly diagrammatic and partly in section, showing a temperature control mechanism embodying my invention as applied to an oil fired water heater;

Fig. 2 is an enlarged sectional detail of one form of operating range adjusting means embodying my invention, and Fig. 3 is an enlarged sectional detail of a modified form of the adjusting means shown in Fig. 2.

Having reference to Fig. 1 of the drawing, mechanism embodying my invention is arranged to control the temperature of water in a heater 10 by varying the opening of a control valve 11 in a pipe 12 through which fuel oil is supplied, from a source not indicated, to an oil burner 13 of any usual construction. The water heater 10 has a fire box 14 into which the burner 13 extends through a suitable opening 15 for the admission of air to support combustion. Above the fire box 14, and surrounded by a flue passage 16, is a water chamber 17 having inlet and outlet water connections 18 and 19 which serve to supply cold water to the heater, from a source not indicated, and to supply hot water from the heater to a region of demand, also not indicated. At the upper end of the passage 16 is a flue duct 20 for connection with a stack which is likewise not shown. While I have illustrated the control mechanism herein as associated with a control valve, a burner, and a hot water heater, it will be understood that the mechanism may be used in connection with valves, or equivalent devices, for governing the value of any variable, such as pressure, liquid level, or the like.

To enable the mechanism to respond to changes in water temperature, it may comprise a temperature responsive device of any well-known construction and, for purposes of illustration, I have herein shown a simple arrangement which consists of a capillary 25 connected at one end to a bulb 26, which is mounted in one wall of the water chamber 17, and connected at the other end to the fixed end of a helical coil 27 which is mounted on a support 28. Secured to the coil, at any selected point, is a clamp 29 having a slotted arm 30 which extends transversely of the coil axis and embraces an axially and pivotally mounted plate 31 provided with a shaft 32. The thermal system includes a suitable expansible fluid, and the parts are so arranged that, on an increase of water temperature, and a corresponding increase of pressure in the thermal system, the coil 27 unwinds and the shaft 32 turns counter-clockwise. On a decrease of water temperature the opposite occurs.

Suitable valve means for governing pressure in a primary fluid system, partially included in a pipe 33, may be in the form of a control couple consisting of a nozzle 34, at the end of the pipe 33, and of a flapper 35, the latter being pivoted at 36 to a flapper lever 37 and adapted to be engaged by an offset member 38 carried by an arm 39 which is secured to the shaft 32. A second arm 40, also secured to the shaft 32, serves to swing a pen 41 across a clock driven recording chart 42, herein partially indicated. It will be understood that on an increase of water temperature, the flapper 35 is moved away from the nozzle 34 to increase the nozzle opening and vice versa.

The pipe 33 and nozzle 34 are connected to a port 45 in a pilot valve block 46 which in turn connects with a restricted orifice 47, herein shown as being provided in a central passage 48 of an orifice housing 49 which is threaded into the pilot valve block, the orifice being preferably adjustable, as by a hand valve 50 threaded into the end member 5 of the housing. The central passage 48 opens through a port 51 into an annular recess 52 formed in the housing 49 and arranged to communicate with a port 53 which, in turn, connects with an inlet valve chamber 54 in the pilot block 46. The chamber is closed at its upper end by a threaded cap 55, and at its lower end is separated by a partition 56 from an outlet chamber 57, a part of which is formed by a recess in the valve block. The partition includes a port 58 having a seat which is adapted to cooperate with a ball valve 59, which is normally urged toward the port by a spring 60 received at its upper end in a suitable recess 44 in the cap 55. Fluid under pressure, such as air, is supplied to the inlet chamber 54 through a port 61 which is connected to a suitable source of supply, not shown, by a pipe 62, preferably having a strainer 63, a reducing valve 64 and a gauge 65, by which means filtered air is supplied to the inlet chamber 54 and to the restricted orifice 47 at a substantially constant gauge pressure, for example 20#, in sufficient volume for control purposes. Flow through the restricted orifice 47 is limited to less than the maximum capacity of the nozzle 34 so that the pressure in the pipe 33, constituting part of the primary fluid system, depends on the throttling position of the flapper 35, which in turn depends on the temperature of water in the heater 10. The pilot valve outlet chamber 57 connects, by means of a port 8 and a pipe 66, with a second pipe 67, which in turn communicates with the interior of a Bourdon compensating tube 68 with which the control mechanism is preferably, although not necessarily, provided. The compensating tube 68 may be fixedly mounted at one end 69 on an instrument back plate, not shown, and may have its free end pivotally connected at 70 to one end of the flapper lever 37, which is pivotally mounted intermediate of its ends at 71 to a fixed support 72. The pilot valve outlet chamber 57 also connects, by way of the port 58 and pipe 66, with a diaphragm chamber 73 of the oil feed control valve 11, pipe 66 having a gauge 74 which serves to indicate the secondary or loading pressure. The control valve is of the reverse acting type; i. e., its valve member 75 is opened on an increase of pressure against a suitable diaphragm spring 76.

The pilot inlet valve 59 is operated by a tubular actuating member 80, mounted on a base 81, to which one end of a bellows 82 is secured, the other end of the bellows being attached to the pilot valve block 46. The upper end of the tubular actuating member 80 is reduced at 83 to provide a combined inlet valve actuating member and exhaust valve. The exhaust valve member together with the tubular member 80 and the bellows 82 define a chamber which communicates with and forms a part of the outlet chamber 57. At the lower side of the pilot block 46 is connected, as by screws 84, a cup-shaped casing 85 which encloses both the bellows 82 and a second bellows 86, the latter being connected at its upper end with the pilot block 46 and at its lower end to a base 87 which is preferably engaged at its central portion by the inner bellows base 81. The lower end of the tubular valve actuating member 80 is connected with an exhaust chamber 89, enclosed by the inner and outer bellows members 82 and 86, and their associated parts, by means of lateral ports 90. The ports 90 serve to permit fluid, escaping through the exhaust valve 83, to pass to the exhaust chamber 89 and from there to the atmosphere through a suitable port 91 in the pilot valve block 46. In addition to the exhaust valve, or variable bleed 83, I preferably provide a small fixed bleed orifice 92 in one wall of the tubular actuating member 80 which serves to keep the inlet valve active and to thereby prevent dead spots in the control. It will be understood, however, that while I preferably employ a restricted bleed 92, the use of such bleed is not essential. The quantity of fluid escaping through the orifice may be so small that the inlet valve 59 will supply sufficient fluid to equal the quantity escaping through the orifice when the inlet valve is substantially closed.

Bellows 86 and casing 85 define a chamber 93 which is in communication with the port 45 in the valve block by means of a side port 94 and therefore is directly connected with and forms a part of the primary fluid system. The outlet chamber 57, port 58, pipe 66, diaphragm chamber 73, connecting pipe 67, and Bourdon tube 68, together comprise a secondary pressure system.

The parts hereinabove described serve to provide a change of pressure in the secondary system which is proportional to a change of water temperature in the heater 10. On an increase of pressure in the primary fluid system, namely pipe 33 and pilot chamber 93, caused by a drop in water temperature and a resulting initial movement of the flapper 35 toward the nozzle 34, outer bellows 86 starts to collapse thereby causing waste valve 83 to engage the inlet valve 59 and increase the flow of fluid from the inlet chamber 54 into the secondary system. As the pressure rises in outlet chamber 57 inner bellows 82 gradually expands and at the same time Bourdon tube 68 partially returns the flapper 35 to its original position. The initial pressure in the pipe 33 and chamber 93 is thus modified and the parts come to balance at an increased pressure in the secondary system, the amount of which increase depends upon the amount of initial opening afforded to the inlet pilot valve 59 as modified by the action of the compensating tube 68. Thus, the pressure increase in the secondary system is in proportion to the pressure increase in the primary system, the ratio of said increases depending upon the ratio of the area of the inner bellows 82 to that of the outer bellows 86. In practice, I have found it convenient to provide a bellows area ratio of approximately 1 to 5 so that for every pound of pressure increase in the primary system, a 5 lb. pressure increase occurs in the secondary system. Thus, if the overall pressure operating range of the control valve 11 is from 0 lbs., when the valve is closed, to 15 lbs. when the valve is fully open, the corresponding overall range in the primary system is 3 lbs.

When a rise in temperature of the heater water occurs, the pressure in the primary system is reduced, and the outer bellows 86 accordingly expands to first close the inlet valve 59 which, when the small bleed 92 is used, is slightly off its seat, and then to open the waste valve 83 and reduce the pressure in the secondary system until the parts come to balance. In this case also the amount of pressure decrease depends upon the degree of opening imparted to the waste valve 83 which is a measure of the pressure reduction required to return it to closed position against the inlet valve 59.

It will be understood by those skilled in the art that if the flow characteristics of the control valve are known, for a given operating condition, the pressure in the secondary system becomes a measure not only of the control valve opening but of the quantity of liquid passing to the burner 13.

While the system hereinabove described provides means for automatically varying the control valve opening throughout its operating range to govern the supply of fuel to the burner 13 as required to maintain a substantially constant heater water temperature, there are many conditions of process control, including the one herein illustrated, wherein it is desirable that the automatic operation of the control valve be restricted to a portion only of its entire operating range. For example, a rise in temperature, caused by a sudden drastic load drop, could be sufficient to cause the control valve 11 to close completely, or to a point at which the fire would be blown out, and a dangerous condition would be created by the further supply of fuel as the water temperature dropped. For this reason, bypasses, automatic stops, auxiliary relay systems and the like have been used to prevent such an occurrence. However, such systems are a source of additional expense and are subject to other difficulties, some of which are enumerated above, when it becomes necessary to completely close the control valve for shut-down or emergency purposes. I have, therefore, provided means, readily accessible to the control operator, which function together with the pilot to provide a selected non-automatic portion of the control valve pressure operating range, whereby the automatic range may be limited from a pressure at which the control valve is fully open to some selected intermediate pressure at which the valve assumes a predetermined minimum opening.

Having reference to Figs. 1 and 2 of the drawing, I show adjustable means, generally indicated at 100, which function with the pilot bellows 82 and with yielding means associated therewith, and to be described, to restrict the effect of pressure changes in the primary system to a selected upper portion only of the primary pressure range and thereby limit the automatic operation of valve 11 to that extent. The means 100 is in the form of a valve which includes, a body 101 having a chamber 102 which is closed at one end by a threaded valve stem 103 provided with a suitable hand member 104, and which has an inlet opening 105 and an outlet opening 106. The inlet opening connects, by means of a pipe 107, to the supply line 62 at a point upstream of the pilot inlet chamber 54, and the outlet opening 106 connects, by a pipe 108 and a port 109, with the port 8 which is a part of the secondary pressure system. The valve stem 103 carries a needle valve 110 which is adapted to cooperate with a suitable valve seat, with which the inlet port 105 is provided, whereby the volume of fluid passing through the valve may be varied as desired.

The yielding means associated with the pilot, referred to above, may be in the form of a conical spring 88 interposed between the bottom 87 of outer bellows 86 and casing 85. Spring 88, together with the bellows 86 and 82, normally maintains inlet valve 59 and exhaust valve 83 substantially closed and further provides yielding means which are resistant to the opening of the exhaust valve by a force which depends on the spring characteristics of said yielding means. Thus, the degree of pressure required in bellows 82 to maintain the exhaust valve 83 at a given opening, assuming that atmospheric pressure exists in chamber 93, depends on the relative area of bellows 82 and the force exerted by the bellows and spring at said opening. In practice, these parts are preferably so arranged that a 15 lb. increase of pressure in chamber 57 will move exhaust valve 83 from closed to full open position. By this combination of valve 100, bellows 82, exhaust valve 83 and yielding means, which may include bellows 86 and 82 and spring 88, any minimum selected pressure required in the secondary system may be provided by varying the flow of fluid through the valve 100 and, therefore, a minimum secondary pressure may be established, as will be clear from the following example.

Let it be assumed that the ratio of areas of bellows 86 and 82 are 5 to 1 and that when the pressures in chambers 93 and 89 are at atmosphere inlet valve 59 and waste valve 83 are substantially closed. Under these conditions, an increase of pressure in the primary system from 0 lbs. to 3 lbs. produces a proportional increase of pressure in the secondary system from 0 lbs. to 15 lbs. For every increment of pressure increase in the primary system, bellows 86 opens inlet valve 59 to increase the pressure in the secondary system, and thereafter bellows 82 moves the inlet valve towards its seat to render the increase of pressure in the secondary system proportional to that in the primary system, allowing sufficient fluid only to enter the secondary system to equal the slight leak through orifice 92. On the other hand, for every increment of pressure decrease in the primary system, waste valve 83 is first opened and then closed to provide a proportional increment of pressure decrease in the secondary system, after which inlet valve 59 remains only slightly open to provide for the leak through orifice 92.

Now, if it be assumed that the pressure in both systems is at atmosphere and that it is desired to provide a minimum opening for control valve 11 corresponding to 5 lbs. valve 100 is opened to admit an independent flow of fluid into the secondary system. As flow into the system is increased by means of valve 100, inlet valve 59 is completely closed and waste valve 83 is opened sufficiently to exhaust a quantity of fluid which, together with the slight amount passing through orifice 92, is equal to the quantity admitted. As waste valve 83 opens, the tension exerted by bellows 82, 86 and spring 88 increases by an amount depending on the spring characteristics of these parts and on the degree of waste valve opening required to pass the volume of fluid admitted by valve 100. Therefore, a corresponding increase of pressure in the secondary system occurs. The flow through auxiliary valve 100 may be increased until gauge 74 indicates a pressure of 5 lbs., the minimum pressure desired. Under these conditions, when the heater 10 requires a control valve opening of more than 5 lbs., for example 10 lbs., flapper 35 will increase the primary pressure from 0 lb. to 1 lb., it being understood that for each increment of pressure increase in the primary system five times the amount of said increment pressure increase occurs in the secondary system. As soon as this pressure increase in the primary system takes place, waste valve 83 will close to a point where the 1 lb. increase of primary system pressure exerted on bellows 86, plus the tension exerted by bellows 82, 86 and spring 88, is in equilibrium with the pressure in bellows 82, at which point the quantity of fluid escaping through waste valve 83, plus the slight amount passing through leak 92 is equal to the quantity of fluid admitted by auxiliary valve 100.

It will be understood from the above that while the pressure required in the primary system to maintain a pressure of 10 lbs. in the secondary system is 2 lbs. when the auxiliary valve 100 is closed, the pressure required in the primary system for this purpose is only 1 lb. when the auxiliary valve is set for a minimum pressure of 5 lbs. If the heater 10 should require control valve 11 to be fully opened, that is, to have an operating pressure of 15 lbs., flapper 35 will raise the primary pressure from 1 lb. to 2 lbs. to establish a proportional pressure in the secondary system of 15 lbs. Thus, while the primary system operates over a total range of 3 lbs. when the auxiliary valve 100 is closed, it can operate over a total range of 2 lbs. only, so long as the auxiliary valve is set to provide a minimum pressure of 5 lbs. And it will be further understood that if the auxiliary valve 100 is opened to provide a quantity of fluid which is sufficient to establish a minimum setting of 10 lbs., the primary system pressure will only have to be raised from 0 lb. to 1 lb. to completely open control valve 11 under a pressure of 15 lbs. It will thus be clear to those skilled in the art that the primary system operating range will be reduced or increased as the minimum pressure setting is raised or lowered, and therefore that portion of the over-all operating range which is automatically controlled may be readily varied by adjusting valve 100.

While the valve 100 functions satisfactorily under most operating conditions, I have found that it has to be cleaned from time to time if the pressure fluid contains impurities, such as dirt or the like, which may tend to lodge at the needle valve 110 and vary the flow with a resultant variation in pressure setting. To overcome this difficulty, I have shown a modified form of device in Fig. 3, generally indicated at 200, which functions together with the pilot to maintain a constant selected flow of fluid in so far as such flow may be affected by particles of dirt or the like in the system. In this figure, the valve is provided with a body 115, in general similar to the body of valve 100, but having a flange 116 at the open end and a partition 117 which separates the interior of the body into an inlet chamber 118, having an opening 119 to which the pipe 107 is connected, and an outlet chamber 120 having an opening 121 to which the pipe 108 is connected. The partition 117 has a central port 122 with which a valve 123 cooperates. The valve is mounted on a stem 124 which passes through the port 122 and is secured to a diaphragm 125 by means of nuts 126 and 127. The periphery of the diaphragm is clamped between the flange 116 and a corresponding flange 128 of a spring case 129, the parts being suitably secured together by screws 130. Within the case 129 is a spring 131, one end of which bears against the nut 127 and the other end of which is engaged by a spring button 133 mounted on an adjusting screw 134 which is threaded into the casing.

In operation, the adjustment is obtained in a manner substantially similar to that of the device shown in Figs. 1 and 2. In order to raise the set minimum pressure in the system to a desired value, for example 5 lbs., the screw 134 is turned in and the valve 123 is opened until the rate of fluid flow required to provide the desired pressure in the system has been established. For example, assuming that the pressure in both the primary and secondary systems is 0 lb., valve 200 may be opened by turning screw 134 until sufficient flow has been initially established to provide a desired pressure in the secondary system of 5 lbs. At this rate of flow of supply fluid, the bellows 82 positions exhaust valve 83 against the yielding means, including bellows 82, 86 and spring 88, at an opening at which the tension exerted by the yielding means produces the pressure desired, namely, 5 lbs., at which pressure the rate of exhaust is equal to the rate of supply. The desired pressure is thus maintained as long as the rate of fluid supply remains constant. In the event that this supply is interrupted and its rate of flow is varied, a corresponding change in pressure would normally result. By means of diaphragm 125, however, which is responsive to pressure in the secondary system, the valve 123 is automatically repositioned to maintain the flow required as initially established by adjustment of screw 134. Thus automatic means are provided for maintaining the rate of flow required by the bellows 82 to establish the predetermined pressure in the secondary system irrespective of occurrences which would tend to vary the flow.

Referring again to the example cited, and assuming that valve 200 has been set to a flow to provide a minimum pressure of 5 lbs. in the secondary system as determined by bellows 82 and spring 88, if the pressure in the primary system increases from 0 lb. to ½ lb., bellows 86 will reduce the opening of exhaust valve 83 and, by means of diaphragm 125, valve 200 will be partially closed to reduce the direct flow of fluid through pipe 108 to the secondary system. This is due to the fact that the increase of pressure under bellows 86 creates a force tending to close exhaust valve 83 which is additional to the force exerted by spring 88 and, therefore, the combined forces would create a higher pressure setting for the secondary system at the rate of flow initially established by valve 200. However, diaphragm 125 reacts to prevent an increase of pressure in the secondary system by reducing the flow through port 122 until the flow is just sufficient to maintain the exhaust valve 83 at an opening against the force of spring 88 and the force occasioned by the increase of pressure in chamber 93 to provide a pressure of 5 lbs. in the secondary system. Thus, an increase of pressure in chamber 93 combines with the force exerted by the spring 88 to reduce the opening of the exhaust valve 83 and the diaphragm 125 combines with this action to reduce the flow to a rate of flow required to maintain the secondary pressure at 5 lbs. However, if a particle of dirt tends to further reduce the flow through valve 200, the diaphragm 125 will react to maintain the flow constant at the rate required by the combined forces of the spring and the pressure in the primary system.

In the example cited, the overall effective operating range of the primary system is from 0 lb. to 2 lbs. when valve 100 is set for a flow to provide a secondary system pressure of 5 lbs., and is from 1 lb. to 3 lbs. when valve 200 is set for a corresponding flow. In each case, the range of the primary system has been reduced from an overall effective range of 3 lbs. to an overall effective range of 2 lbs., and it is incidental whether the effective operating range is from 0 lb. to 2 lbs. or from 1 lb. to 3 lbs. so long as the effective range is reduced in proportion to the initial setting of either of the valves 100 or 200. Both of these valves may be set to establish an initial flow to which the bellows structure and spring 88 react to establish a minimum pressure in the secondary system in accordance with the rate of said initial flow.

While I have herein described in detail the mechanism embodying my invention as herein illustrated, I do not desire to be limited to the specific construction shown, as the structure is subject to various modifications without departing from the spirit and scope of my invention as defined in the following claims.

I claim:

1. In a control mechanism, the combination with a primary fluid pressure system having a source of fluid under pressure, a secondary fluid pressure system, a pilot valve including a body having an inlet port connected with a source of fluid under pressure and an outlet port connected with a region of low pressure, an inlet valve and an exhaust valve controlling said ports, yielding means resistant to the opening of said exhaust valve, a valve for varying the pressure in said primary system, a first bellows responsive to a change of pressure in said primary system, a second bellows responsive to a change of pressure in said secondary system opposing the action of said first bellows, said bellows being in operative connection with said inlet and exhaust valves to vary the flow of fluid through said secondary system on a change of pressure in said primary system to provide a proportional change of pressure in said secondary system, and a second valve for varying an independent flow of fluid directly to said secondary system to which said second bellows reacts against said resilient means to open said exhaust valve and provide a corresponding flow of fluid from said secondary system and thereby maintains a minimum pressure therein as determined by said resilient means and by the rate of flow initially established by said second valve.

2. In a control mechanism, the combination with a primary fluid pressure system, a secondary fluid pressure system, a source of fluid pressure for each of said systems, a valve for varying the pressure in the primary system, an inlet valve for admitting fluid from said source to the secondary system, an exhaust valve for said secondary system, and first means responsive to pressure in each of said systems for operating said inlet and exhaust valves jointly to vary the pressure in the secondary system proportionately to a change of pressure in the primary system, of second means operating in conjunction with said first means for varying said exhaust valve only to vary the pressure in the secondary system in accordance with the rate of exhaust therefrom, and a second valve for varying an independent flow of fluid from a fluid pressure source directly to the secondary system.

3. In a control mechanism, the combination with a primary fluid pressure system, a secondary fluid pressure system, a source of fluid pressure for each of said systems, a valve for varying the pressure in the primary system, an inlet valve for admitting fluid from said source to the secondary system, an exhaust valve for said secondary system, and means responsive to the pressure in each of said systems for operating said inlet and exhaust valves jointly to vary the pressure in the secondary system proportionately to a change of pressure in the primary system, of resilient means operating in conjunction with said first means for governing said exhaust valve only to vary the pressure in the secondary system in accordance with the rate of exhaust therefrom, and a second valve for varying an independent flow of fluid from a fluid pressure source directly to the secondary system.

4. In a control mechanism, the combination with a primary fluid pressure system, a secondary fluid pressure system, a source of fluid pressure for each of said systems, a valve for varying the pressure in the primary system, an inlet valve for admitting fluid from said source to the secondary system, an exhaust valve for said secondary system, and means responsive to the pressure in each of said systems for operating said inlet and exhaust valves jointly to vary the pressure in the secondary system proportionately to a change of pressure in the primary system, of a spring operating in conjunction with said first means for governing said exhaust valve only to vary the pressure in the secondary system in accordance with the rate of exhaust therefrom, and a second valve for varying an independent flow of fluid from a fluid pressure source directly to the secondary system.

5. In a control mechanism, the combination with a primary fluid pressure system, a secondary fluid pressure system, a source of fluid pressure for each of said systems, a valve for varying the pressure in the primary system, an inlet and an exhaust valve connecting said secondary system with the source of fluid pressure and with a region of low pressure, and a bellows structure responsive to pressure in each of said systems for operating said inlet and exhaust valves jointly to vary the pressure in the secondary system proportionately to a change of pressure in the primary system, of resilient means associated with said bellows structure for actuating said exhaust valve only to vary the pressure in the secondary system in accordance with the rate of exhaust therefrom, and a second valve for varying an independent flow of fluid from a fluid pressure source directly to the secondary system.

6. In a control mechanism, the combination with a primary fluid pressure system, a secondary fluid pressure system, a source of fluid pressure for each of said systems, a valve for varying the pressure in the primary system, an inlet port connecting the source of fluid pressure with the secondary system, an inlet valve for said port, a valve actuating member including an outlet port cooperating with said inlet valve to vary the admission of fluid to and exhaust of fluid from the secondary system, and a flexible structure responsive to change in each of said systems to vary the pressure in the secondary system proportionately to a change of pressure in the primary system, of resilient means associated with said structure for varying the pressure required to open said exhaust valve in accordance with the rate of exhaust therefrom, and a second valve for varying an independent flow of fluid from a fluid pressure source directly to the secondary system.

7. In a control mechanism, the combination with a primary fluid pressure system, a secondary fluid pressure system, a source of fluid pressure for each of said systems, a valve for varying the pressure in the primary system, an inlet port connecting the source of fluid pressure with the secondary system, an inlet valve for said port, a first bellows responsive to pressure in the primary system, a second bellows opposing said first bellows and responsive to pressure in the secondary system, and a tubular valve actuating member within said second bellows in operative connection therewith, said tubular valve actuating member connecting with a region of low pressure and having a valve seat cooperating with said inlet valve to vary the pressure in the secondary system proportionately to a change of pressure in the primary system, of a spring associated with said bellows for closing said exhaust valve to vary the pressure required to open said exhaust valve in accordance with the rate of exhaust therefrom, and a second valve for varying an independent flow of fluid from an independent fluid pressure source directly to the secondary system.

8. In a control mechanism, the combination with a primary fluid pressure system, a secondary fluid pressure system, a source of fluid pressure for each of said systems, a valve for varying the pressure in the primary system, an inlet valve for admitting fluid from said source to the secondary system, and first means responsive to pressure in each of said systems for operating said inlet and exhaust valves jointly to vary the pressure in the secondary system proportionately to a change of pressure in the primary system, of second means operating in conjunction with said first means for varying said exhaust valve only to vary the pressure in the secondary system in accordance with the rate of exhaust therefrom, a second valve for varying an independent flow of fluid from a fluid pressure source directly to the secondary system, and third means responsive to pressure in the secondary system in operative connection with said second valve.

9. In a control mechanism, the combination with a primary fluid pressure system, a secondary fluid pressure system, a source of fluid pressure for each of said systems, a valve for varying the pressure in the primary system, an inlet valve for admitting fluid from said source to the secondary system, and first means responsive to pressure in each of said systems for operating said inlet and exhaust valves jointly to vary the pressure in the secondary system proportionately to a change of pressure in the primary system, of second means operating in conjunction with said first means for varying said exhaust valve only to vary the pressure in the secondary system in accordance with the rate of exhaust therefrom, a second valve including a valve member for varying an independent flow of fluid from a fluid pressure source directly to the secondary system, and a spring loaded diaphragm responsive to pressure in the secondary system in operative connection with said valve member.

EARL A. HUBLEY.